United States Patent [19]
Yoshida

[11] 3,859,981
[45] Jan. 14, 1975

[54] APPARATUS FOR SOLIDIFYING THE YOLK OF HEN'S EGGS

[75] Inventor: Chukichi Yoshida, Tokyo, Japan

[73] Assignee: Asahi Egger Company Inc., Tokyo, Japan

[22] Filed: Jan. 7, 1974

[21] Appl. No.: 431,102

[30] Foreign Application Priority Data
Jan. 13, 1973 Japan.................................. 48-6742

[52] U.S. Cl..................... 126/374, 99/330, 99/410, 99/440, 219/439
[51] Int. Cl. .......................................... A47j 29/02
[58] Field of Search ............ 99/330, 403, 440, 410; 219/401, 431, 439, 430, 437; 126/362, 374, 376, 377, 383, 386, 387; 426/170

[56] References Cited
UNITED STATES PATENTS

| | | | |
|---|---|---|---|
| 964,029 | 7/1910 | Langworthy..................... | 126/377 X |
| 2,287,396 | 6/1942 | Roth ................................. | 99/410 |
| 3,020,824 | 2/1962 | Pantermoller..................... | 99/440 X |
| 3,210,193 | 10/1965 | Martin............................... | 99/403 X |
| 3,636,308 | 1/1972 | Hatch ................................ | 219/439 |

Primary Examiner—William F. O'Dea
Assistant Examiner—Harold Joyce
Attorney, Agent, or Firm—Oblon, Fisher, Spivak, McClelland & Maier

[57] ABSTRACT

The interior of an outer receptacle is partitioned into a machine compartment and an inner tank. In the upper portion of said inner tank, an inner container adapted to hold hen's eggs for the treatment contemplated by this invention is disposed in a freely detachable state. In the lower portion of the inner tank, there is disposed a body of water in which a heater and thermostats are laid. The inner tank is provided at an upper part with an outlet for hot water and at a bottom part with an inlet for hot water respectively, with the outlet and the inlet interconnected via a water feed pump disposed inside the machine compartment. The water in said inner tank is heated by the heater to a prescribed temperature and maintained constant by means of the thermostats. The water supply pump inside the machine compartment draws in hot water through the lower part of the inner tank and discharges it through an L-shaped nozzle freely rotatably disposed at the upper part of the inner container so as to have the hot water circulated through the interior of the inner container. The circulation of hot water serves to maintain the interior of the inner container at a uniform temperature so that only the yolks of the hen's egg held in the inner container are solidified.

3 Claims, 2 Drawing Figures

1

APPARATUS FOR SOLIDIFYING THE YOLK OF HEN'S EGGS

BACKGROUND OF THE INVENTION

This invention relates to an apparatus for solidifying the yolks of hen's eggs. More particularly, this invention relates to an apparatus which, by utilizing the fact that the white of a hen's egg solidifies at temperatures of 72°C and higher and the yolk at temperatures of 62°C and higher, heats hen's eggs at intermediate temperatures at which only the yolks are solidified and the whites remain in a half-boiled state in the hen's eggs.

To solidify only the yolk of a hen's egg, the egg must be maintained at temperatures in the range between 62°C and 72°C for not less than 20 minutes. At temperatures of 72°C and higher, the white as well as the yolk of the hen's egg is solidified. At temperatures of less 62°C, even the yolk remains unsolidified. In order for only the yolk of the hen's egg to be solidified in as short a period of time as possible, therefore, the egg must be kept at a temperature in the neighborhood of 70°C. This temperature is critical. A temperature difference greater than 1°C in the apparatus, can result in the solidification of yolks in only some of the hen's eggs subjected to the treatment and not in the remainder.

With the conventional constant temperature devices, it has been extremely difficult to maintain the temperature difference within 1°C. Moreover, such devices have required a very long time in effecting selective solidification of the yolks of hen's eggs.

It is, therefore, the primary object of this invention to provide an apparatus which permits only the yolks in a large number of hen's eggs to be solidified to a uniform extent in a short period of time without entailing the difficulty mentioned above.

SUMMARY OF THE INVENTION

To accomplish the object described above, the apparatus according to this invention comprises an outer receptacle the interior of which is partitioned into an inner tank and a machine compartment. This inner compartment is provided at an upper part thereof with an outlet for hot water and at a lower part thereof wth an inlet for hot water respectively. The machine compartment incorporates a water feed pump adapted to draw in hot water through said inlet and discharge the introduced hot water through said outlet. In the upper portion of said inner tank, an inner container adapted to hold hen's eggs subjected to the treatment contemplated by this invention is disposed in a freely detachable state. In the lower portion of the inner tank, there is stored a body of water in which a heater and thermostats are disposed. As the body of water in the lower portion of the inner tank is heated by the heater to a prescribed temperature, the thermostats regulate the flow of electric current to said heater to keep the water's temperature constant and, at the same time, the water feed pump draws in hot water through the lower portion of the inner tank and discharges the introduced hot water through the L-shaped nozzle disposed in a freely rotatable state at the upper portion of the inner container so that the hot water will be circulated through the interior of the inner container, with the result that the interior of the inner container is uniformly heated to the prescribed temperature. This circulation of hot water serves to permit only the yolks of hen's eggs held in the inner container to be solidified. Since the apparatus according to this invention uniformly heats the entirety of the inner container at the prescribed temperature, only the yolks of all the hen's eggs held in the inner container are solidified without any possibility of overheating. Further, since the eggs can be treated at a temperature only slightly lower than the temperature at which their whites are solidified, the duration of the treatment can be decreased to a pronounced extent.

The other objects and characteristics of the present invention will become apparent from the description to be given in further detail herein below with reference to the accompanying drawing.

Figure 1:
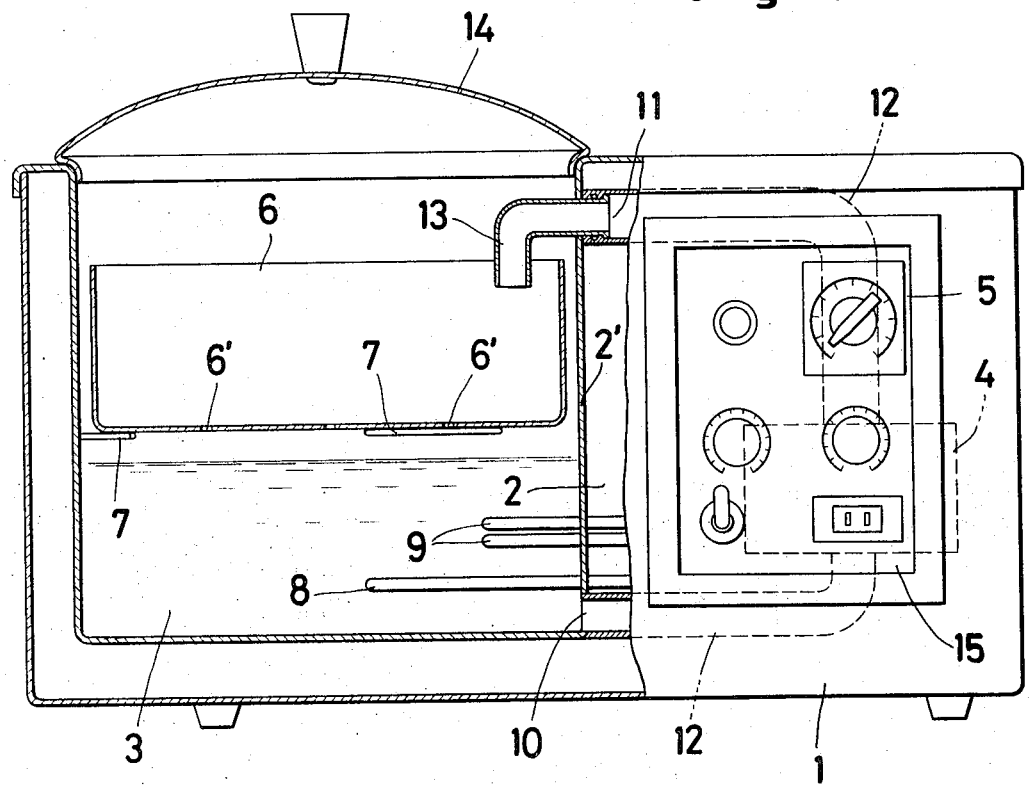
FIG. 1 is a partially cut-away front view illustrating one preferred embodiment of the apparatus according to the present invention.
Figure 2:
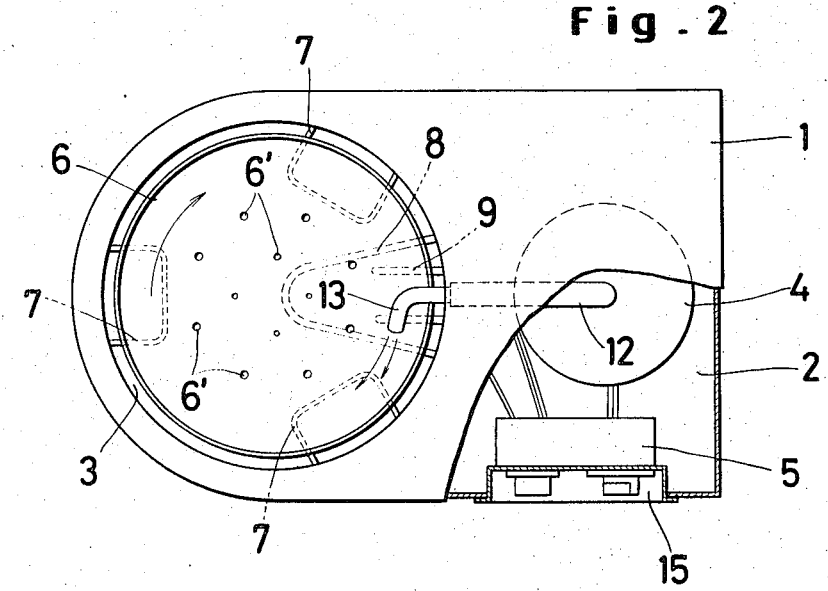
FIG. 2 is a plan view of the apparatus illustrated in FIG. 1.

DETAILED DESCRIPTION OF THE INVENTION:

Referring to FIG. 1, the interior of an outer receptacle 1 is divided by a partition wall 2' into a machine compartment 2 and an inner tank 3. In the machine compartment 2, there are disposed a water feed pump 4, a timer 5, electric circuits, etc. At an intermediate depth of the inner tank 3, supporting bases 7 are fixed to provide support for an inner container 6 to be held in a freely detachable state at the upper portion of the inner tank 3. In the lower portion of the inner tank 3, there are disposed a heater 8 and thermostats 9. According to the illustrated preferred embodiment, there are incorporated two thermostats 9: One of the thermostats serves the purpose of stopping the flow of electric current to the heater 8 after the hot water held inside the inner tank 3 has been heated by the heater 8 to reach the set level of temperature and the other thermostat functions to actuate the timer 5 after the hot water has reached said set level of temperature. If occasion demands, however, the latter thermostat may be omitted by having the timer 5 so adapted as to be set by a separate switch. Into the inner tank 3, an inlet 10 for hot water opens at the bottom portion and an outlet 11 for hot water opens at the upper portion respectively. The inlet and the outlet are interconnected by a water feed pipe 12 through the water feed pump 4 inside the machine compartment 2. By means of the water feed pump 4, the hot water which has been elevated to the prescribed temperature is drawn in through the inlet 10 and then discharged through the nozzle 13 of the outlet 11 into the interior of the inner container 6. If, at this time, the nozzle 13 is directed aslant downwardly, then the hot water discharged therethrough flows in a circular path along the inner vertical face of the inner container 6 and at the same time flows downwardly through the small holes 6' bored in the bottom of said container 6. In the meantime, the hen's eggs held inside the inner container 6 are cooked as they are rotated in the hot bath within the inner container 6 by virtue of the current formed by the hot water discharged from the nozzle 13. Consequently, the eggs are heated uniformly throughout.

The actuating temperature of the thermostat 9 is set at 70°C, for example. Then, the body of water placed in the lower portion of the inner tank 3 is heated to the prescribed temperature by the heater 8 and the water feed pump 4 discharges the hot water through the nozzle 13 into the inner container 6, with the result that the hen's eggs held inside the container 6 begin to be cooked. At this time, since the nozzle 13 introduces the hot water so as to make the hot water flow in a circular path in the inside of the inner container 6, the temperature of the inside of the inner container 6 is maintained at a substantially uniform level. As a result, the multiplicity of hen's eggs held therein are heated and only the yolks thereof are uniformly solidified.

The body of hot water held in the lower portion of the inner tank 3 is maintained at a fixed temperature by virtue of the thermostat 9. Even if the eggs are cooked for a prolonged time, there is absolutely no possibility of the whites of the eggs being solidified by over heating. The treatment given by the apparatus of the present invention does not entail any alteration of the molecular structure of the protein which forms the principal component of the whites of these eggs but serves an additional purpose of low-temperature sterilization. Thus, the eggs cooked by the apparatus of this invention enjoy good preservability and high digestibility. The hot water inside the inner tank 3 is circulated by being drawn in through the inlet 10, passed through the pipe 12 via the water feed pump 4 and forcibly discharged through the outlet 11.

To the outlet 11, an L-shaped water feed nozzle 13 is water-tightly fitted in a freely rotatable state. Said nozzle 13 is extended so that the tip thereof opens into the inner container 6 which is disposed inside the iner tank 3.

The upper side of the inner container 6 is kept open and the bottom side thereof contains a plurality of small holes 6'. The number or size of said small holes 6' is so fixed that the volume of hot water allowed to flow downwardly through the small holes 6' is equal to or slightly smaller than the volume of hot water introduced through the nozzle 13. The numeral 15 denotes a switchboard designed to permit selection of the thermostat temperature, setting of the timer and switching of the flow of electric current to the heater 8.

In the apparatus of the construction such as is described above, a lid 14 is removed from the apparatus to place a multiplicity of hen's eggs in the inner container 6. The lower portion of the inner tank 3 is filled with cold or hot water to a level barely clear of the bottom of the inner container 6. The heater 8 is energized to start heating said water to the prescribed temperature and the water feed pump 4 is actuated to effect circulation of hot water. As the water is elevated to the prescribed temperature, the flow of electric current to the heater 8 is stopped. When the temperature of the water begins to fall below the prescribed level, the flow of electric current to the heater 8 is started again to maintain the water's temperature constant at all times. Thus, the heater 8 is controlled.

According to the present invention, the hen's eggs are heated by elevating the temperature of the water held inside the inner tank 3 to the prescribed temperature and then causing the hot water kept at the prescribed temperature to be supplied uniformly through the interior of the inner container as already described above. When the eggs are heated by the apparatus of this invention at a temperature only slightly below the lowest temperature at which the whites are solidified, therefore, only the yolks are quickly solidified without causing the whites to be solidified. Normally, when eggs are heated at 70°C, the time required for their yolks to be solidified is about 15 minutes. The apparatus of this invention, therefore, enables only the yolks of hen's eggs to be automatically solidified when the timer is set to the graduation of 15 minutes and interlocked with the thermostat 9 so that the thermostat 9 sets the timer 5 to motion at the moment the temperature of the water inside the inner tank 3 reaches the prescribed level. Alternatively, the timer 5 may be set to a time interval which allows for the length of time required for the body of water inside the inner tank 3 to be elevated to the prescribed temperature.

Further, the temperature of the interior of the inner container 6 can be maintained at a constant level by controlling the thermostat 9. This means that hen's eggs can be cooked into wholly boiled eggs, as occasion demands, by having the thermostat 9 set to a temperature of more than 72°C. In this case, since the eggs are boiled as they are rotated inside the inner container 6, the yolks are allowed to remain at the center of the eggs. The fact that the boiled eggs consequently obtained have their yolks at the center serves to enhance the ornamental function when these eggs are put to use wherein they are cut across the center into two or three equal portions and served in the cut state.

In addition, the apparatus of the present invention can readily be utilized for heating and maintaining milk, soup and the like at a fixed temperature, for thawing frozen foods and for making yoghurt.

What is claimed is:

1. An apparatus for the solidification of yolks of hen's eggs, comprising in combination an outer receptacle having the interior thereof partitioned into an inner tank and a machine compartment, said inner tank being provided at an upper part with a hot water outlet and at a lower part with a hot water inlet respectively and said machine compartment incorporating therein a water feed pump adapted to draw in hot water through said inlet and discharge the hot water through said outlet; an inner container disposed in a freely detachable state at the upper portion of said inner tank, said inner container having an open upper side to admit hot water introduced through said outlet and incorporating a multiplicity of small holes bored through the bottom thereof; and a body of water in the lower portion of said inner tank, said body of water having a heater and thermostats disposed therein, whereby the body of water held in the lower portion of the inner tank is heated by the heater to a prescribed temperature, maintained at a constant temperature by virtue of the thermostats and, at the same time, supplied to and circulated through the interior of the inner container by means of the water feed pump.

2. An apparatus according to claim 1, wherein an L-shaped nozzle is fitted in a water-tight and freely rotatable state to the tip of the outlet so that the hot water is supplied along the inner wall of the inner container.

3. An apparatus according to claim 1, wherein the small holes bored through the bottom of the inner container are such that the amount of hot water flowing downwardly therethrough is slightly smaller than the amount of hot water introduced through the nozzle.

* * * * *